United States Patent [19]

Wilson

[11] Patent Number: 4,916,936
[45] Date of Patent: Apr. 17, 1990

[54] DEVICE FOR TESTING PACKAGES

[75] Inventor: Earl Wilson, Ingleside, Ill.

[73] Assignee: The Kendall Company, Boston, Mass.

[21] Appl. No.: 223,593

[22] Filed: Jul. 25, 1988

[51] Int. Cl.⁴ .............................................. G01M 3/32
[52] U.S. Cl. ......................................... 73/37; 73/49.2
[58] Field of Search ...................... 73/492 R, 37, 49.3, 73/52

[56] References Cited

U.S. PATENT DOCUMENTS

| | | | |
|---|---|---|---|
| 3,826,126 | 7/1974 | Yasuhiro | 73/37 |
| 3,955,402 | 5/1976 | Harrill | 73/37 |
| 4,285,230 | 8/1981 | Hartness | 73/37 |
| 4,459,843 | 7/1984 | Durham | 73/37 |

Primary Examiner—Hezron E. Williams
Assistant Examiner—Joseph W. Roskos
Attorney, Agent, or Firm—Powell L. Sprunger

[57] ABSTRACT

A device for testing a package having, a device for passing a fluid inside the package, and a device for selectively controlling the rate of pressure increase inside the package by the passing device.

1 Claim, 1 Drawing Sheet

DEVICE FOR TESTING PACKAGES

BACKGROUND OF THE INVENTION

The present invention relates to a device for testing packages.

A testing device for packages is known, such as the ARO tester, sold by The ARO CORPORATIN Buffalo, N.Y. This device constitutes a pressure regulator which is utilized to inflate a package until it bursts. However, in this device the rate of pressure increase in the package is uncontrolled and unmeasured which leads to inconsistent results. In fact, however, the rate of pressure increase in the package is important in the test. For example, if the package is inflated at a relatively fast rate the package may burst, whereas if the package is inflated at a relatively slow rate the generated pressure has a minimal effect on the package. Thus, it is important to control the rate of pressure increase in the package during testing.

SUMMARY OF THE PRESENT INVENTION

A principal feature of the present invention is the provision of an improved device for testing packages.

The testing device of the present invention comprises, means for passing a fluid inside the package, and means for controlling the rate of pressure increase inside the package by the passing means.

Thus, a feature of the present invention is that the device controls the rate of pressure increase in the package such that the effect of the package size, package porosity, and package geometry is minimized during testing.

Another feature of the present invention is that the rate of pressure increase inside the package may be selectively controlled.

Yet another feature of the invention is that the package integrity may be correlated to a sterilizer for the package in which the package is subjected to pressure increases.

Another feature of the present invention is that the actual rate of pressure increase in the package is compared with the selected rate of pressure increase, and the passing means is modified to obtain the selected rate of pressure increase in the package.

Still another feature of the invention is that the maximum pressure in the package may be controlled by the device, and the passing means is inhibited when the maximum pressure is obtained.

Another feature of the invention is that the duration of the passing means may be controlled at a selected time.

Yet another feature of the invention is that the device improves the test reproducibility of the packages.

A further feature of the invention is that the device provides an improved accuracy of testing of the package.

Further features will become more fully apparent in the following description of the embodiments of this invention and from the appended claims.

DESCRIPTION OF THE PREFERRED EMBODIMENTS

Figure 1:
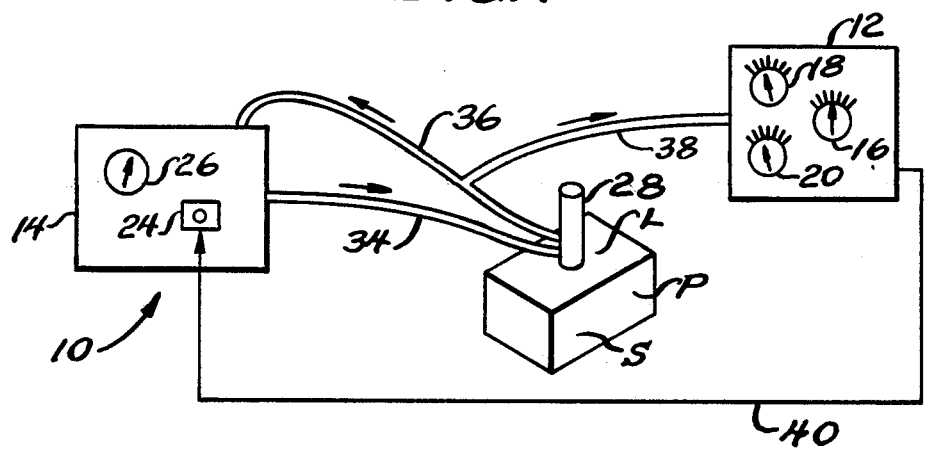
FIG. 1 is a diagrammatic view of a testing device for a package of the present invention.
Figure 3:
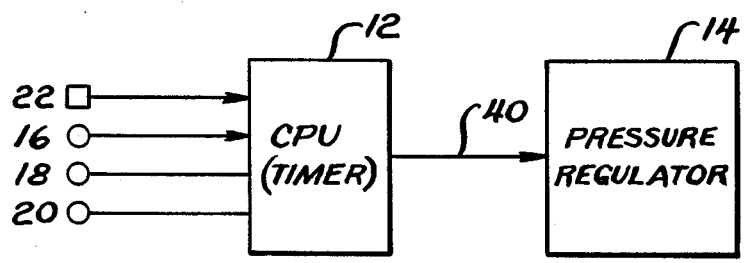
FIG. 3 is a diagrammatic view of a controller for the device of FIG. 1.

Referring now to FIGS. 1 and 3, there is shown a testing device generally designated 10 for a package P. The package P may be of a type having somewhat rigid sidewalls S, and a lid L attached to the sidewalls S.

The device 10 has a controller 12 and an air flow regulator 14. The controller 12 has a dial 16 to select a desired rate of pressure increase in the package P. The controller 12 also has a second dial 18 to select the maximum pressure generated in the package P. The controller 12 further has a third dial 20 to select the duration of the test on the package P. As shown in FIG. 3, the first, second, and third dials 16, 18, and 20 are connected to a central processing unit (CPU), with the central processing unit having an internal timer for a purpose which will be described below. Also, the controller 12 has a pressure transducer 22 connected to the central processing unit for a purpose which will be described below.

The regulator 14 has a source of fluid, such as air, and generates a pressure. The regulator 14 has a control 24 which controls the pressure generated by the regulator 14, and in turn controls the fluid flow by the regulator 14. Thus, the rate of pressure increase from the source may be controlled by the regulator 14 by the control 24, as will be further discussed below. The regulator 14 also has a gauge 26 to measure and indicate the maximum pressure generated by the regulator 14.

Figure 2:
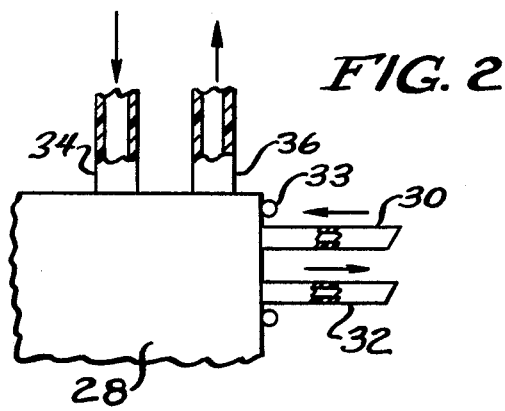
FIG. 2 is a fragmentary view, taken partly in section, of a probe for establishing fluid communication with the package.

With reference to FIGS. 1 and 2, the device 10 has a probe 28 having a pair of two sharpened tubular sections 30 and 32 which may pass through the sidewalls S or lid L of the package P to establish fluid communication with the package P through the tubular sections 30 and 32. The probe 28 has an elastic O-ring 33 extending around the tubular sections 30 and 32 to seal against the package P. The device 10 has a first conduit 34 establishing communication between the regulator 14 and the tubular section 32 in order to pass fluid from the regulator 14 through the conduit 34 and the tubular section 32 into the package P. The device 10 also has a second conduit 36 establishing fluid communication between the tubular section 30 and the gauge 26 of the regulator 14. The device 10 has a third conduit 38 establishing communication between the second conduit 36 and the pressure transducer 22 in the controller 12.

Thus, a desired rate of pressure increase is first selected by the dial 16 on the controller 12, which is electrically connected by a lead 40 from the controller 12 to the control 24 of the regulator 14. In turn, the control 24 causes a rate of pressure increase to be generated by the regulator 14, and the resulting fluid is passed through the conduit 34 and through the probe 28 into the package P in order to generate a selected rate of pressure increase in the package P. The fluid under pressure in the package P passes through the second conduit 36 and third conduit 38 to the pressure transducer 22 which measures the actual pressure in the package P, and in turn the central processing unit calculates the actual pressure over a period of time by an internal timer in order to calculate the actual rate of pressure increase in the package P. The central processing unit compares the actual rate of pressure increase with the selected rate of pressure increase by the dial 16, and generates a signal by the lead 40 to the control 24 of the regulator 14 in order to modify the rate of pressure increase to the selected rate of pressure increase in the package P, such that the controller 12 modifies and controls the rate of pressure increase in the package P to the selected rate of pressure increase. In this manner, the selected rate of pressure increase is established by a feedback loop between the controller 12 and regulator 14 to maintain the desired rate of pressure increase in the package P.

As previously discussed, the second conduit 36 is connected to the gauge 26 in order to indicate the maximum pressure established in the package P. The second dial 18 on the controller 12 may be selected to obtain a maximum pressure in the pacakge P. As previously discussed, the second dial 18 is connected to the central processing unit, and when the desired maximum pressure is reached in the package P, as measured by the pressure transducer 22, the central processing unit inhibits further operation of the regulator 14 by the lead 40 in order to inhibit further operation of the device 10 when the desired maximum pressure is reached. Also, as previously discussed, the dial 20 may be utilized to select the duration of the test by the device 10. The dial 20 is connected to the central processing unit, and the internal timer of the central processing unit calculates the time for the test, and inhibits the regulator 14 by the lead 40 when the desired duration of the test has expired in order to stop further operation of the device 10. Alternatively, the device 10 may be operated until the package P bursts under the pressure generator by the regulator 14 under the controlled rate of pressure increase, and the maximum pressure generated during the test will be indicated by the gauge 26 on the regulator 14.

In this manner, the device 10 generates a selected and controlled rate of pressure increase in the package P until the test has been stopped as controlled by either of the dials 18 and 20 or by bursting of the package P. The device 10 improves reproducibility and reduces the effects of variables in the testing such as package porosity, package geometry, or package stiffness. The device 10 results in improved accuracy of testing under a controlled rate of pressure increase which is important in determining the package integrity. Also, the results from the testing device 10 for the package integrity may be correlated to a sterilizer in which the sterilizer is simulated where the pressure increases.

Although any suitable rate of pressure increase may be utilized by the device 10, in a preferred form the rate of pressure increase generated by the regulator 14 is in the range of 10 to 500 inches of water pressure per minute as selected and controlled by the device 10.

The foregoing detailed description is given for clearness of understanding only, and no unnecessary limitations should be understood therefrom, as modifications will be obvious to those skilled in the art.

What is claimed:

1. A device for testing a package, comprising: means for generating a fluid pressure;
   first conduit means connecting the generating means and the package;
   means for measuring the actual pressure in the package; second conduit means connecting the package and measuring means;
   means for controlling the rate of pressure increase of the generating means;
   means for selecting the rate of pressure increase of the generating means;
   means for calculating the actual rate of pressure increase inside the package responsive to the measuring means; and
   means for modifying the generating means responsive to comparison of the selecting means and calculating means to obtain the selected rate of pressure increase in the package.

* * * * *